United States Patent
Park et al.

(10) Patent No.: US 12,145,443 B2
(45) Date of Patent: Nov. 19, 2024

(54) APPARATUS FOR RECOGNIZING A USER POSITION USING AT LEAST ONE SENSOR AND METHOD THEREOF

(71) Applicant: HYUNDAI MOBIS CO., LTD., Seoul (KR)

(72) Inventors: Sung Hyun Park, Hwaseong-si (KR); Jun Seong Seo, Yongin-si (KR); Sol Ji Yoo, Seoul (KR); Hyang Sook Kim, Seongnam-si (KR); Ji Eun Hwang, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/077,310

(22) Filed: Dec. 8, 2022

(65) Prior Publication Data
US 2023/0219417 A1 Jul. 13, 2023

(30) Foreign Application Priority Data
Jan. 12, 2022 (KR) .......................... 10-2022-0004668

(51) Int. Cl.
*B60K 35/00* (2024.01)
*B60K 35/10* (2024.01)
(Continued)

(52) U.S. Cl.
CPC .............. *B60K 35/00* (2013.01); *G06F 3/042* (2013.01); *G06F 3/0421* (2013.01);
(Continued)

(58) Field of Classification Search
CPC .............. B60K 35/00; B60K 2370/152; B60K 2370/20; B60K 2370/52; B60K 2370/736; B60K 2370/741; B60K 37/06; B60K 2370/175; B60K 2370/73; B60K 35/10; B60K 35/22; B60K 35/28; B60K 35/65; B60K 35/654; B60K 35/81; B60K 2360/111; B60K 2360/141; B60K 2360/1464; B60K 2360/175; B60K 2360/20; B60K 2360/48; B60K 2360/741; G06F 3/042; G06F 3/0482; G06F 3/04886; G06F 2203/04108; G06F 3/0421; G06F 3/1431; G06F 3/041; G06F 3/0412; G06F 3/04166; G06F 2203/04101; G06F 3/0481; B60W 50/14; B60W 40/08;
(Continued)

(56) References Cited

U.S. PATENT DOCUMENTS

2006/0253801 A1* 11/2006 Okaro ............... H04M 1/72403
715/810
2009/0158217 A1* 6/2009 Stuart .............. H04N 21/42692
715/841

(Continued)

*Primary Examiner* — Douglas M Wilson
(74) *Attorney, Agent, or Firm* — NovoTechIP International PLLC

(57) ABSTRACT

A vehicle according to embodiments includes a display unit displaying information related to the vehicle, a sensor unit detecting a position of a user of the vehicle, and a processor controlling the display unit, wherein the sensor unit is located at a bottom end of the display unit and wherein the sensor unit includes at least one or more light emitting units emitting light and at least one or more sensors receiving the light.

12 Claims, 14 Drawing Sheets

(51) Int. Cl.

| | |
|---|---|
| *B60K 35/22* | (2024.01) |
| *B60K 35/81* | (2024.01) |
| *G06F 3/042* | (2006.01) |
| *G06F 3/0481* | (2022.01) |
| *G06F 3/0482* | (2013.01) |
| *G06F 3/04886* | (2022.01) |
| *B60K 35/28* | (2024.01) |
| *B60K 35/65* | (2024.01) |
| *B60W 40/08* | (2012.01) |
| *B60W 50/14* | (2020.01) |
| *G06F 3/14* | (2006.01) |

(52) U.S. Cl.
CPC ........ *G06F 3/0482* (2013.01); *G06F 3/04886* (2013.01); *B60K 35/10* (2024.01); *B60K 35/22* (2024.01); *B60K 35/28* (2024.01); *B60K 35/65* (2024.01); *B60K 35/654* (2024.01); *B60K 35/81* (2024.01); *B60K 2360/111* (2024.01); *B60K 2360/141* (2024.01); *B60K 2360/1464* (2024.01); *B60K 2360/20* (2024.01); *B60K 2360/48* (2024.01); *B60K 2360/741* (2024.01); *B60W 40/08* (2013.01); *B60W 50/14* (2013.01); *B60W 2050/146* (2013.01); *B60W 2420/40* (2013.01); *B60Y 2400/301* (2013.01); *G06F 3/0481* (2013.01); *G06F 3/1431* (2013.01); *G06F 2203/04101* (2013.01); *G06F 2203/04108* (2013.01)

(58) Field of Classification Search
CPC ....... B60W 60/0013; B60W 2050/146; B60W 2420/40; B60Y 2400/301
See application file for complete search history.

(56) References Cited

U.S. PATENT DOCUMENTS

| | | | |
|---|---|---|---|
| 2014/0236454 A1* | 8/2014 | Mattes | G06F 3/0481 701/102 |
| 2015/0301688 A1* | 10/2015 | Cho | G06F 3/0446 345/175 |
| 2018/0217670 A1* | 8/2018 | Cho | G06F 3/0446 |
| 2018/0232057 A1* | 8/2018 | Takada | G06F 3/016 |
| 2021/0294426 A1* | 9/2021 | Li | G01S 17/42 |

* cited by examiner

<SECTION A - A>

APPARATUS FOR RECOGNIZING A USER POSITION USING AT LEAST ONE SENSOR AND METHOD THEREOF

CROSS-REFERENCE TO RELATED APPLICATIONS

Pursuant to 35 U.S.C. § 119(a), this application claims the benefit of earlier filing date and right of priority to Korean Application No. 10-2022-0004668, filed on Jan. 12, 2022, the contents of which are hereby incorporated by reference herein in their entirety.

TECHNICAL FIELD

The present embodiments are applicable to vehicles in all fields, and more specifically, for example, to the technology of recognizing a position of a user of a vehicle.

BACKGROUND

The Society of Automotive Engineers (SAE), the American Society of Automotive Engineers, subdivides autonomous driving levels into six levels, for example, from level 0 to level 5. However, full automation of level 5 has not yet been commercialized.

Therefore, according to the technology so far, a driver should visually check the signs installed throughout the road and manually respond accordingly. Thus, the driver is unable to concentrate on driving, and the number of unexpected accidents is increasing.

SUMMARY

Accordingly, embodiments of the present disclosure are directed to an apparatus for recognizing a user position using at least one sensor and method thereof that substantially obviate one or more problems due to limitations and disadvantages of the related art.

To solve the above-described problems, the present disclosure is designed to automatically control a vehicle based on a type of sign information recognized via a front camera and the like and various sensing information.

According to one embodiment of the present disclosure, by determining a freezing danger section based on a road freezing sign and temperature information received from a temperature sensor, a vehicle is designed to automatically enter a winter mode.

A winter mode in the present specification means, for example, changing a vehicle driving mode to an optimal condition in a freezing danger section.

More specifically, normally in a standard (S) mode, transmission gears are controlled to be automatically and sequentially shifted from first, second, third and fourth gear by starting from the first gear. Yet, in a winter (W) mode, the transmission gears are controlled to start from the second or third gear automatically instead of starting from the first gear to prevent vehicle wheels from spinning with no traction when many cars stop and go repeatedly due to heavy traffic jam at a low temperature.

According to another embodiment of the present disclosure, a vehicle is designed to automatically close a sunroof by determining a falling stone danger section based on a sign for falling stone warning and a wind speed information received from a wind speed sensor.

According to further embodiment of the present disclosure, the speed of a vehicle is designed to be automatically decelerated based on a signboard for cross-wind warning and a wind speed information received from a wind speed sensor.

Finally, in the process of implementing the present disclosure, sensing information is necessarily required, and thus it is intended to propose a solution for minimizing frequent sensing.

Technical tasks obtainable from the present disclosure are non-limited by the above-mentioned technical tasks. Also, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, in one technical aspect of the present disclosure, a vehicle according to embodiments may include a display unit displaying information related to the vehicle, a sensor unit detecting a position of a user of the vehicle, and a controller or processor controlling the display unit, wherein the sensor unit may be located below (or at a bottom end of) the display unit and wherein the sensor unit may include at least one or more light emitting units emitting light and at least one or more sensors receiving the light. In another aspect, a method of controlling a vehicle may include emitting light to detect a position of a user's hand by a sensor unit, receiving the light by the sensor unit, detecting the position of the user's hand based on the received light, displaying a first menu information corresponding to a first zone related to the position of the user's hand by a display unit, and displaying a second menu information corresponding to a second zone related to the position of the user's hand by the display unit, wherein the sensor unit may be located at a bottom end of the display unit and wherein the sensor unit may include at least one or more light emitting units emitting the light and at least one or more sensors receiving the light.

Accordingly, the present disclosure provides various effects and/or advantages.

Embodiments may provide intuitive ease of use. Embodiments provide an effect of easily selecting a menu, which used to be selected through several steps, with a single touch. Embodiments provide an effect of selecting a menu without extending a hand long.

Effects obtainable from the present disclosure may be non-limited by the above-mentioned effect. Further, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION

Figure 1:
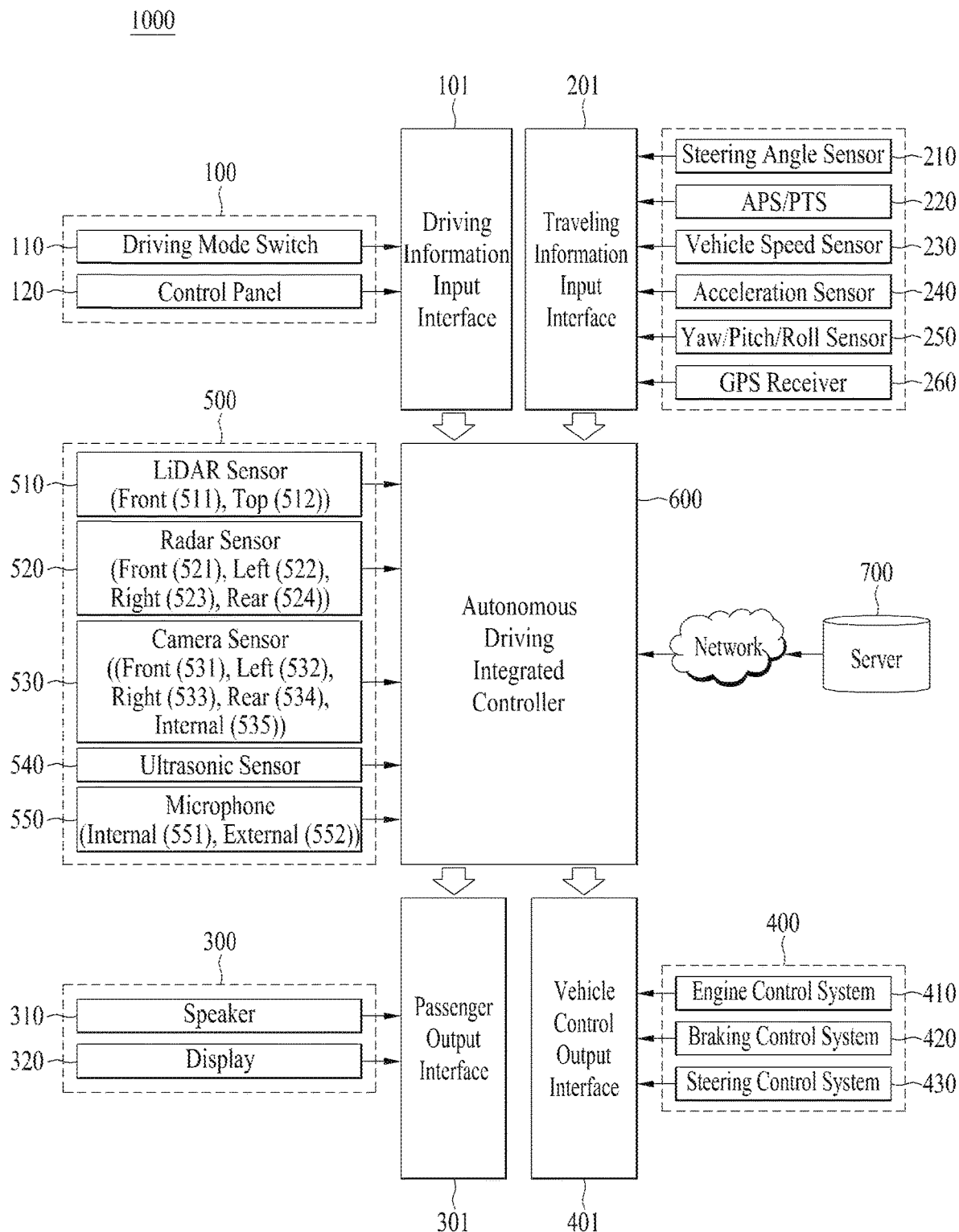
FIG. 1 illustrates an overall block diagram of an autonomous driving control system to which an autonomous driving apparatus according to any one of embodiments of the present disclosure is applicable.

Hereinafter, with reference to the accompanying drawings, it will be described in detail for those of ordinary skill in the art to which the present invention pertains to easily implement the embodiments of the present invention. However, the present invention may be embodied in several different forms and is not limited to the embodiments described herein. And in order to clearly explain the present invention in the drawings, parts irrelevant to the description are omitted, and similar reference numerals are attached to similar parts throughout the specification.

Throughout the specification, when a part "includes" a certain component, it means that other components may be further included, rather than excluding other components, unless otherwise stated.

FIG. 1 is an overall block diagram of an autonomous driving control system to which an autonomous driving apparatus according to any one of embodiments of the present disclosure is applicable.

Figure 2:
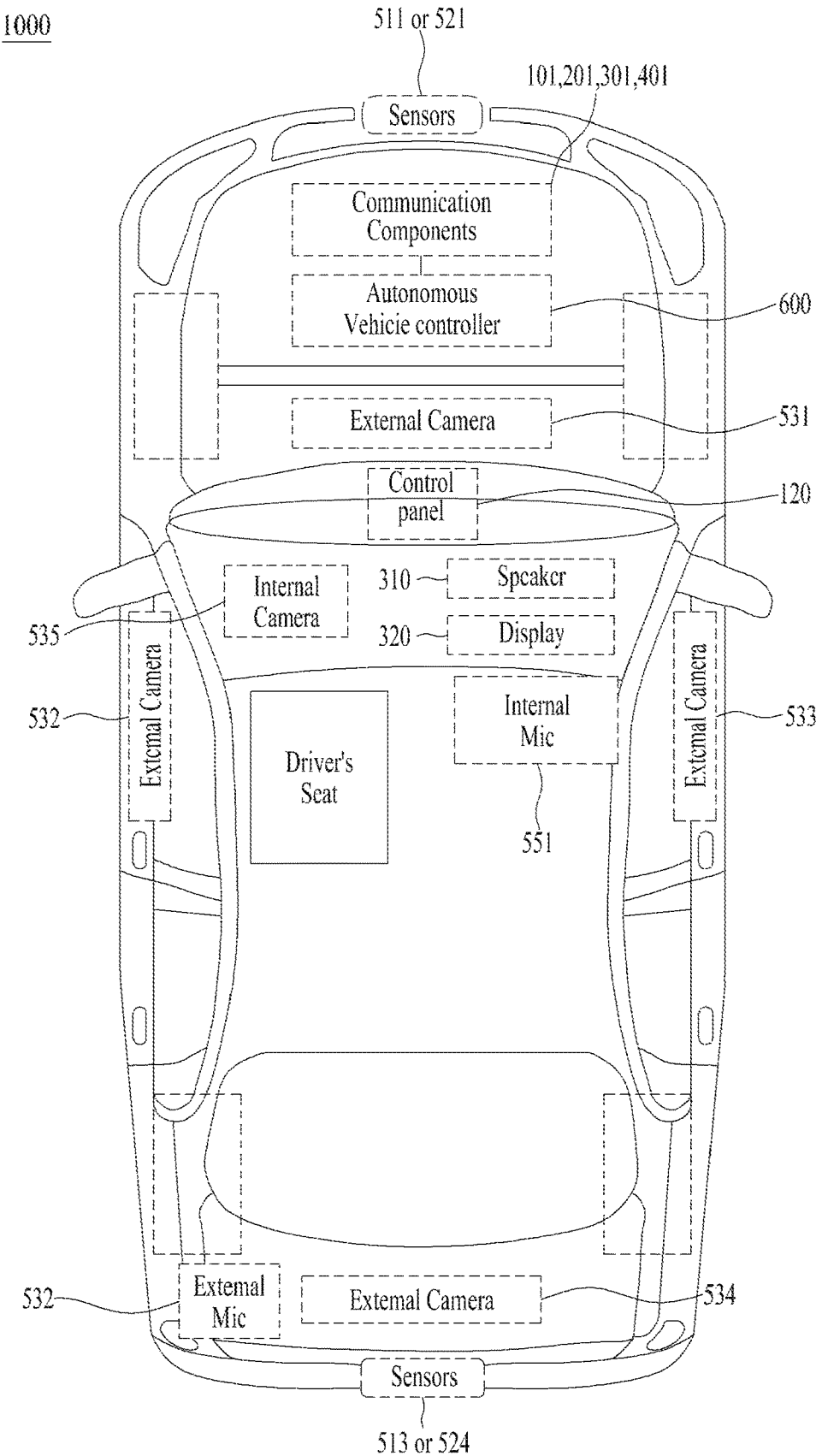
FIG. 2 illustrates a diagram illustrating an example in which an autonomous driving apparatus according to any one of embodiments of the present disclosure is applied to a vehicle.

FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
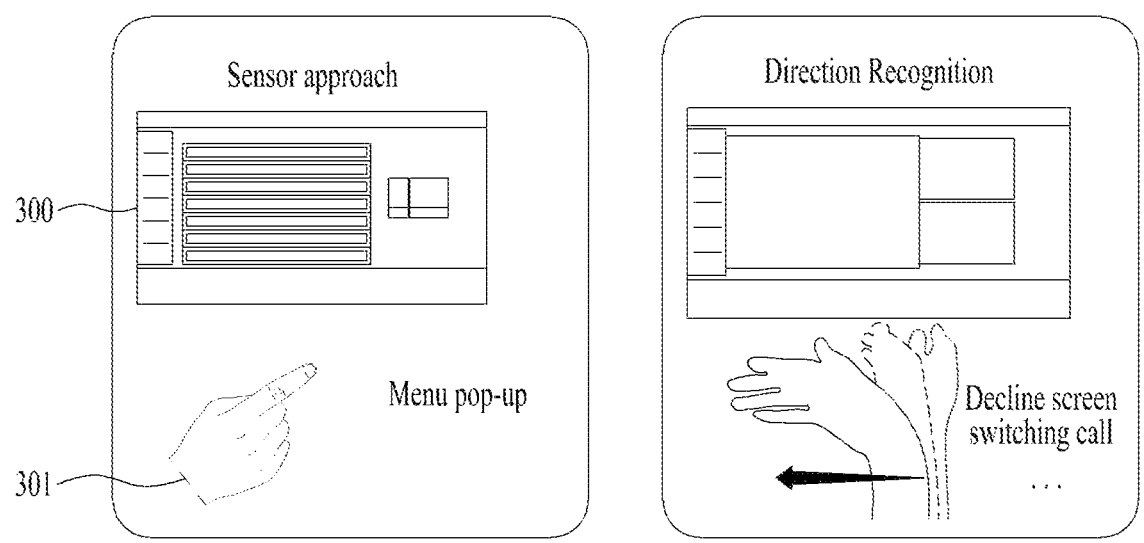
FIG. 3 illustrates a display method of providing a menu by recognizing a user's hand through a sensor of a vehicle according to embodiments.

FIG. 3 illustrates a display method of providing a menu by recognizing a user's hand through a sensor of a vehicle according to embodiments.

A sensor illustrated in FIG. 3 may correspond to the sensor unit 500 illustrated in FIG. 1 and FIG. 2. A display 300 shown in FIG. 3 may correspond to the display 320 shown in FIG. 1 and FIG. 2.

A vehicle, a vehicle control method, and the vehicle display 300 according to embodiments may display the display information for the vehicle and a user of the vehicle. The sensor may recognize a position of a user's hand 301, and the display may pop up menu information based on the user's hand position. The display may include a sensor for recognizing the position of the user's hand. The vehicle, the vehicle control method, and the display of the vehicle according to the embodiments may recognize a gesture of a user's hand and display menu information. When the user's hand moves in a predetermined direction, the vehicle, the vehicle control method, and the display of the vehicle may recognize the direction and support an operation of changing a display screen, declining an a call reception, or the like.

The vehicle, the vehicle control method, and the display of the vehicle according to the embodiments may be reduced to be referred to as a method/apparatus according to embodiments.

The vehicle, the vehicle control method, and the display of the vehicle according to embodiments may improve the following problems. For example, when a user approaches based on a sensor, the display is activated or deactivated, and various other functions can be provided. It is possible to provide a menu pre-information function further than simply providing a menu pop-up. In addition, trial and error processes or teaching may be required for a normal swipe operation. Depending on a direction and shape of hand movement, problems of frequent error occurrence and reduced use convenience may be improved. For example, only a case of a long hand movement trajectory is set to be recognized as a swipe, or it is able to prevent errors in incorrectly recognizing a simple hand movement as a swipe when a trajectory is set to be short.

According to embodiments, the vehicle, the vehicle control method, and the display of the vehicle may efficiently provide a menu pre-information function employing a proximity sensor to provide intuitive usability of In-Vehicle Infotainment (IVI) products. Through this, there is an effect that provides intuitive use convenience and does not require separate education or experience. In addition, it is easy to select a menu, which used to be selected through various steps, with a single touch. A menu may be selected without extending a hand long, and the menu may be popped up close to a driver or a passenger. The limitations of the sensor function for recognizing a position of a hand may be supplemented through UI and algorithms. It is possible to maintain a high-quality design by applying a thin proximity sensor. Time-difference infrared LED light emitting technology has the effect of reducing the number of LEDs and PDs.

Figure 4:
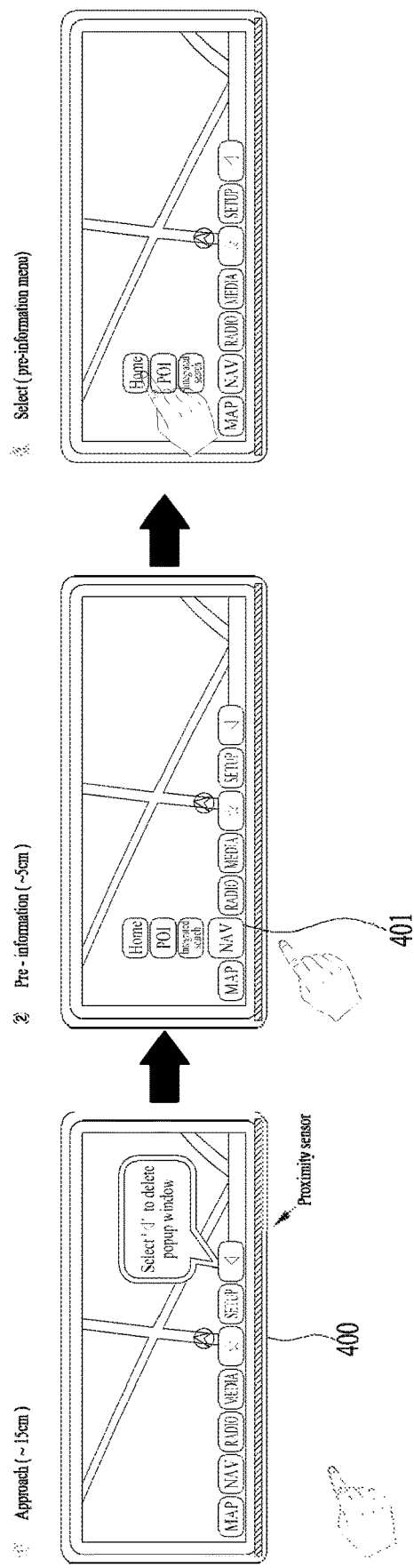
FIG. 4 illustrates an example of providing pre-information depending on a position of a user's hand according to embodiments.

FIG. 4 illustrates an example of providing pre-information depending on a position of a user's hand according to embodiments.

The vehicle, the vehicle control method, and the vehicle display according to the embodiments of FIGS. 1 to 3 may provide different functions depending on user's positions as shown in FIG. 4.

For example, a proximity sensor of the vehicle, the vehicle control method, and the vehicle display according to embodiments may recognize that a user is located at a distance (range) of 15 cm. This may be referred to as an approach step. In the approach step, a device according to embodiments may display a pop-up menu 400. When a position of a user's hand is located within a distance (range) of 5 cm, pre-information 401 may be provided. The user may receive a service by selecting a desired menu through a pre-information function. The distances of 15 cm and 5 cm may be variously set depending on embodiments. If an icon is selected from pop-up menus, the corresponding menu may not be popped up. In addition, pop-up settings may be changed depending on a position approached by a hand. That is, a pop-up menu may be provided at a close distance so as not to extend a hand long.

The pre-information 401 according to embodiments may include a more detailed item as a submenu of the pop-up initial menu 401. For example, a destination, a search menu and the like according to a navigation menu may correspond to the pre-information.

A method/apparatus according to embodiments may distinguish a zone according to a position of a user's hand and a monitor distance: Approach: Basic menu popup (~15 cm approach), Pre-information: Pre-information additional popup (~5 cm approach).

Figure 5:
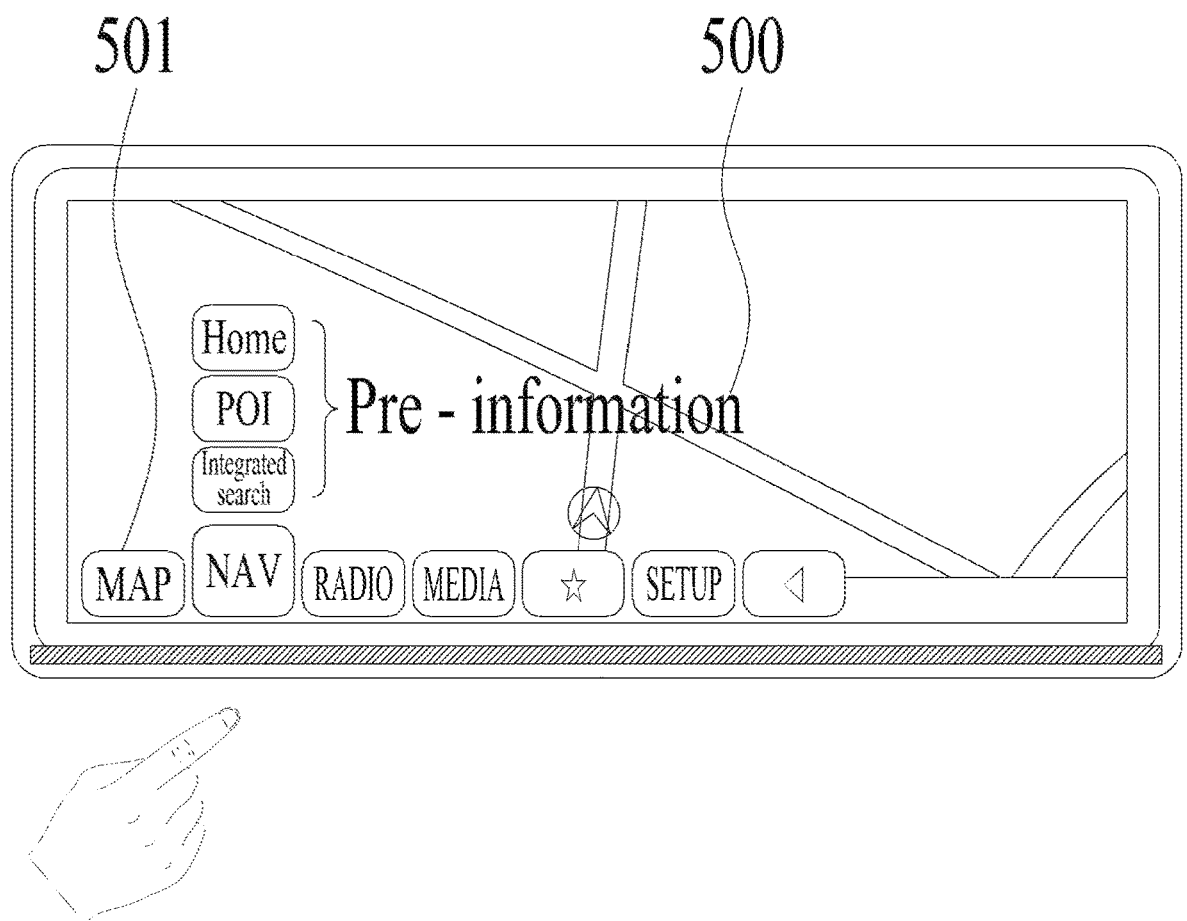
FIG. 5 illustrates an example of pre-information according to embodiments.

FIG. 5 illustrates an example of pre-information according to embodiments.

FIG. 5 illustrates the pre-information configuration described in FIG. 4 and the like.

Since a method/apparatus according to embodiments pops up submenus in response to a movement of a hand, there is an effect of easily extending a hand without separate education or experience. That is, it is possible to easily select a desired menu and provide intuitive usability. It is possible to improve the problem of selecting a menu through multiple paths to select a specific menu. It is possible to provide a function of selecting a desired menu with a single touch by providing "menu pre-information" information as a pop-up menu.

Menu pre-information according to embodiments is a function of displaying a submenu with high frequency of use in advance, and refers to an embodiment of recognizing a position of a hand on a user's hand approach and popping up the corresponding submenu. In this case, the popped-up submenu may be selected with a single touch. That is, the submenu transfer step may be simplified. By recognizing the position of the user's hand, a submenu 500 of a menu item 501 approached by the user's hand may be displayed.

Figure 6:
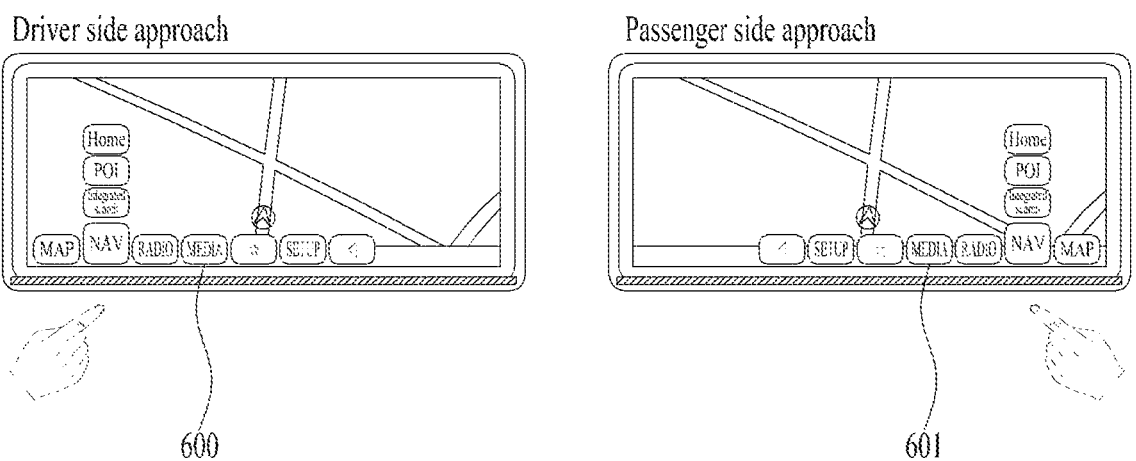
FIG. 6 illustrates an example of pre-information according to embodiments.

FIG. 6 illustrates an example of pre-information according to embodiments.

FIG. 6 illustrates an example of a position of the pre-information of FIG. 5 being changeable.

The vehicle, the vehicle control method, and the display of the vehicle according to embodiments may recognize a position of a driver's hand to provide a menu close to a driver (600), or may recognize a position of a passenger's hand to provide a menu close to the passenger (601).

In other words, a pop-up menu may be popped up close to a user so that a monitor may be controlled in a comfortable position. As a monitor size increases and becomes larger, a space of a physical key button is reduced, and thus a menu display position may be important. To touch and control the monitor, it may be difficult to operate a screen due to a large size of the screen, and there may be a problem of extending a hand long. By solving this problem, embodiments may provide a pop-up menu close to a driver when a hand comes in from a driver side. On the contrary, when a hand comes in from a passenger side, the embodiments may provide a pop-up menu close to the passenger side.

Figure 7:
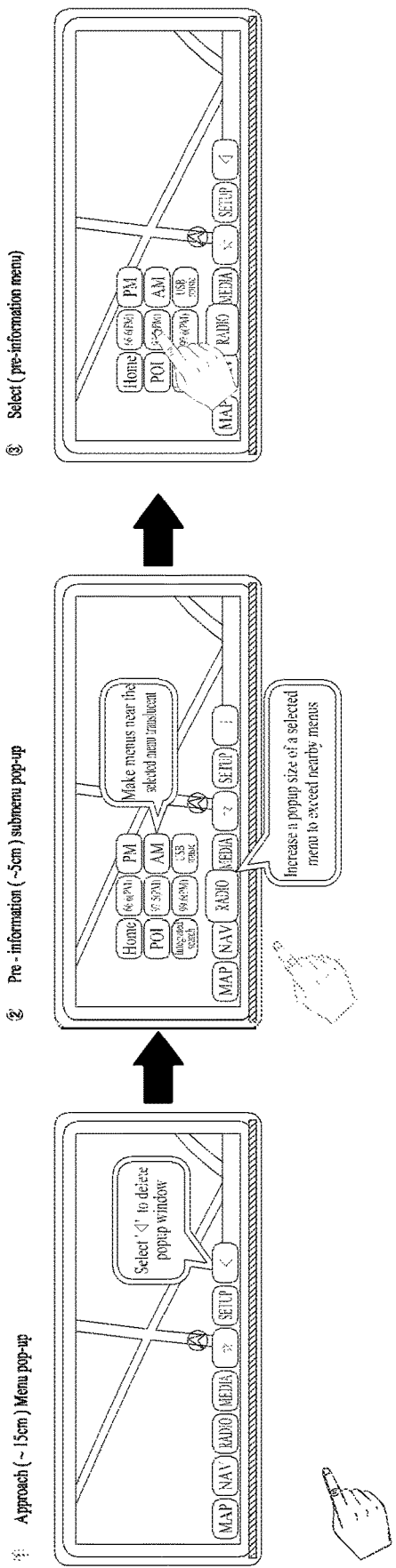
FIG. 7 illustrates an example of pre-information according to embodiments.

FIG. 7 illustrates an example of pre-information according to embodiments.

FIG. 7 illustrates the pre-information of FIGS. 4 to 6 in detail.

Approaching step: When a position of a user's hand enters a predetermined distance (e.g., a first distance or a first range), the vehicle, the vehicle control method, and the display of the vehicle according to the embodiments may display a pop-up menu. If you want to delete the pop-up menu, a pop-up window may be deleted by receiving a signal for selecting a specific icon from the user.

Pre-information providing step: When a position of a user's hand enters a predetermined distance (e.g., a second distance or a second range), a submenu (pre-information) of a menu icon approached by the user's hand may be displayed along with a main menu. For convenience of user's recognition, the vehicle, the vehicle control method, and the vehicle display according to embodiments may further provide the following functions. For example, an icon of the main menu approached by the user's hand may be displayed larger than a surrounding icon of the main menu. That is, the size may be changed to be larger. When the user's hand is positions between a first menu of the main menu and a second menu of the main menu, the vehicle, the vehicle control method, and the vehicle display according to the embodiments may clearly pop up a pre-information of the first menu while popping up the pre-information of the second menu semi-transparently if the first menu is closer to the position of the user's hand. The user may intuitively select a menu by viewing a translucent surrounding submenu and a main submenu with high resolution at once.

Menu selecting step: the vehicle, the vehicle control method, and the vehicle display according to the embodiments may receive an input signal from the user and provide a function of a selected menu to the user.

In other words, it may be supplemented through a screen UI to overcome technical limitations that are difficult to accurately match a position of a hand and a pop-up menu. A size of a hand-located menu may be increased. If a user selects a wrong menu, it can be supplemented so that the user can actively leave the wrong position. The left and right sides of the pre-information pop-up of the selected menu can also be displayed as translucent (Ghost) to provide convenience in menu selection. Even if the hand does not select an exact location of the menu, it can be supplemented so that a desired submenu can be easily selected. A pop-up blocking function may be added to improve the disturbed driver attention problem due to frequent pop-ups occurring on raising a hand.

Figure 8:
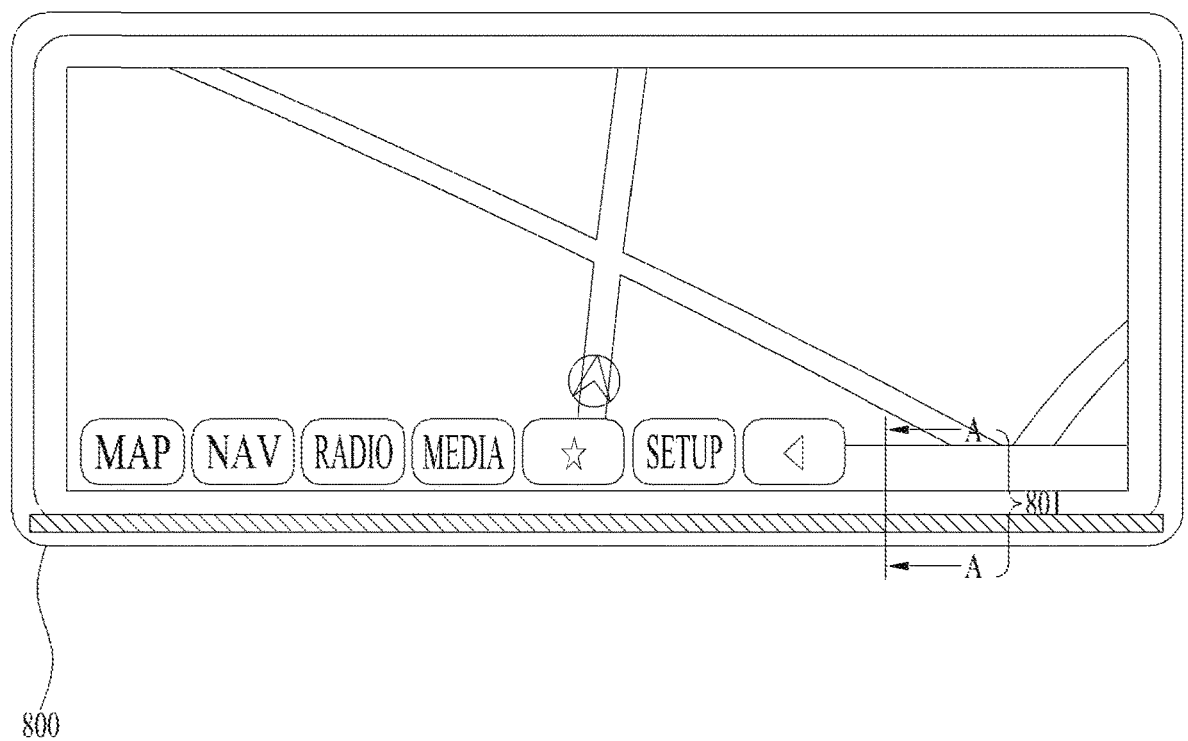
FIGS. 8 to 10 illustrate a proximity sensor for pre-information according to embodiments.
Figure 9:
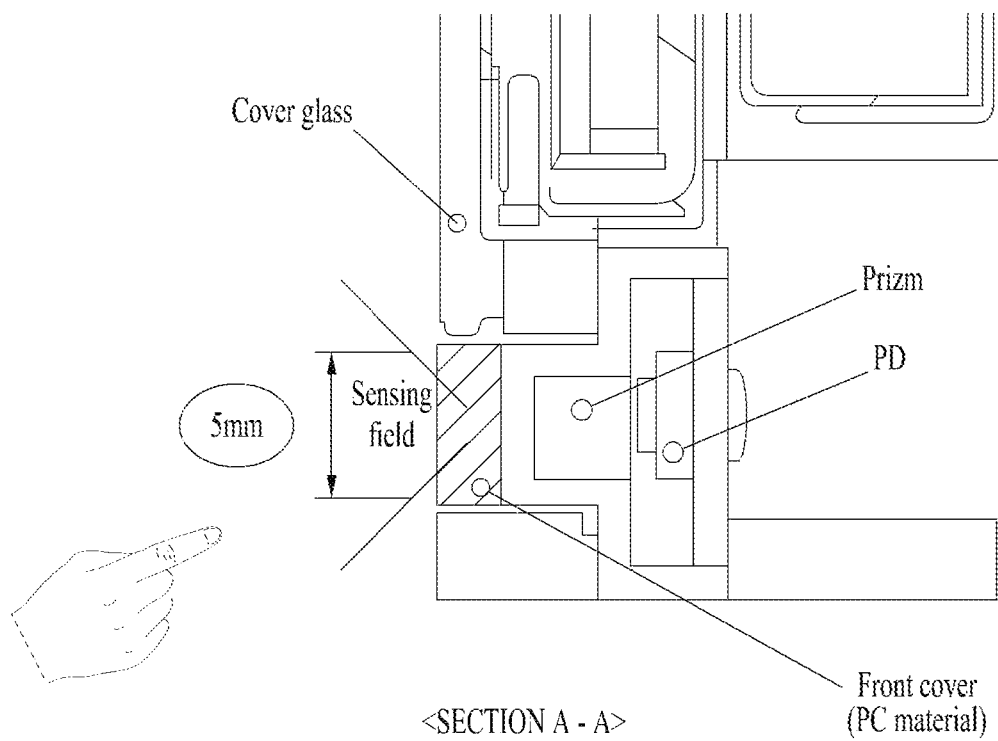
Figure 10:
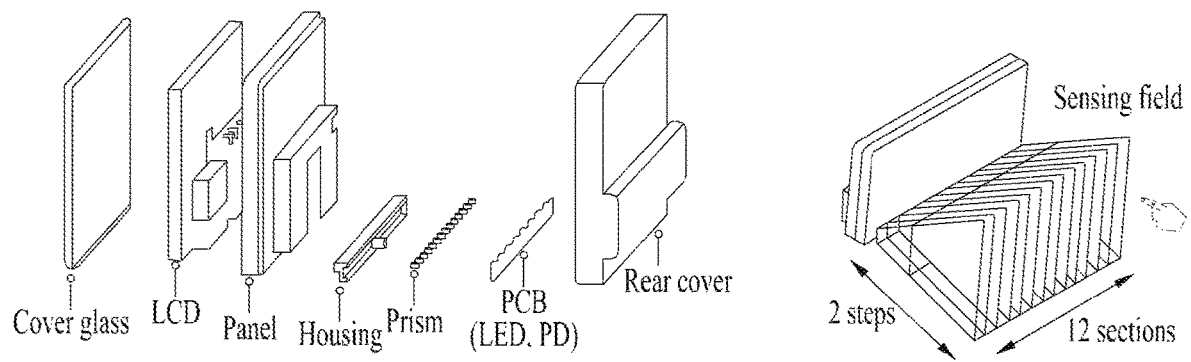

FIGS. 8 to 10 illustrate a proximity sensor for pre-information according to embodiments.

FIGS. 8 to 10 illustrate a location and configuration of a proximity sensor supporting operations of the vehicle, the vehicle control method, and the vehicle display according to the embodiments described in FIGS. 1 to 7.

Referring to FIG. 8, a proximity sensor according to embodiments may be located in a specific area 800 of a display. For example, it may be located in the lower area of the display. The thickness 801 of the proximity sensor according to embodiments may be, for example, within a range of 5 mm. The proximity sensor may be configured to be thin to increase user convenience and improve design aesthetics. The proximity sensor may include an Infrared Ray (IR) sensor.

Referring to FIG. 9, a sensor area A of a display is illustrated in detail. Specifically, there are a proximity sensor (sensing area) with a thin thickness and a cover glass covering the surroundings of the sensor. Within the sensor, there are a prism, a PD, and a front cover (PC material). The PD according to embodiments may be a photo diode, and may include an optical sensor that converts light energy into electric energy, etc.

Referring to FIG. 10, a sensor according to embodiments may include a cover glass, an LCD, a panel, a proximity module (i.e., a housing, a prism, and a PCB including LED and PD), a rear cover, and the like.

A sensing area (or sensing field) of the sensor according to embodiments may have various zones/sections. The sensing area/field according to embodiments may largely include a first section and a second section. The first section may correspond to an area for recognizing an approach step. The second section may be divided into 12 sections in more detail. This may be a section for grasping in detail a position of a user's hand for each menu in the pre-information step. The number of sections according to embodiments may be variously configured.

Figure 11:
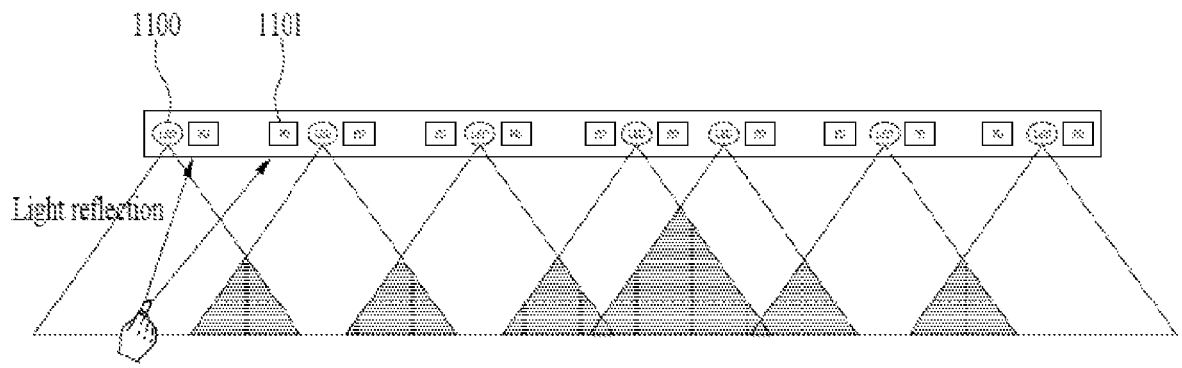
FIG. 11 and FIG. 12 illustrate an example of a sensing area according to embodiments.
Figure 12:
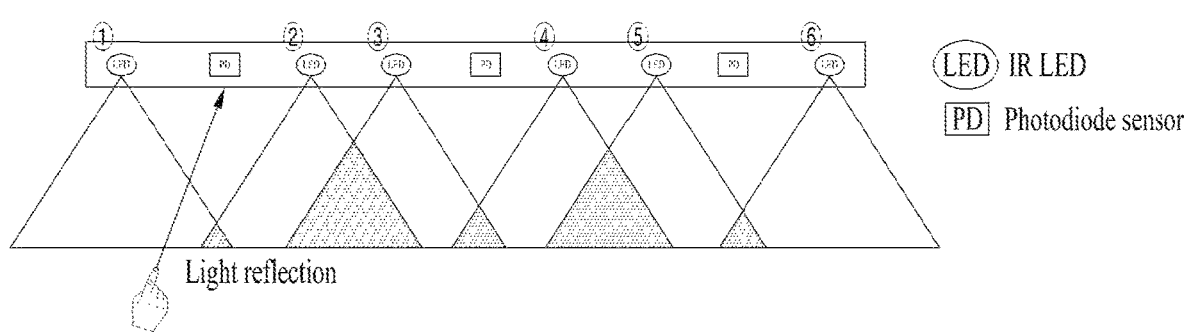

FIG. 11 and FIG. 12 illustrate an example of a sensing area/field according to embodiments.

FIG. 11 and FIG. 12 illustrate an example of implementing the sections of the sensing area/field shown in FIG. 10.

The vehicle, the vehicle control method, and the vehicle display according to the embodiments may include a sensor having a sensing area/field such as FIG. 11 or FIG. 12.

Referring to FIG. 11, the sensor may include an infrared LED 1100 and a photodiode sensor 1101. The sensor may include at least one LED 1100 and at least one PD sensor 1101. The infrared LED 1100 may transmit light, and the photodiode sensor 1101 may receive light reflected by a user/hand. A position of the user/hand may be detected by sensing the reflected light.

After the infrared LED emits light, the infrared intensity reflected from the hand may be detected by the PD, and a hand position may be recognized according to the position and strength of the PD. The LED may continuously maintain a light emitting state. As the position recognition resolution becomes higher, the number of PDs increases proportionally. For example, 12 PDs may be required if divided into 12 sections. A plurality of LEDs maintain a light emitting state continuously, and as the number of sensors increases, there may be a problem of inefficiency.

Referring to FIG. 12, a sensor and a sensing area/field may be more efficiently implemented. According to embodiments, it is possible to reduce the amount of LEDs and PDs by applying a time difference infrared LED light emitting technology. According to embodiments, LEDs may emit light with a time difference in the order of ① to ⑥. A hand position may be recognized through the position of the LED by detecting the recognized time of the infrared light reflected from the hand. In this case, the intensity of infrared light may be recognized complexly, so that a distance from the hand and the position of the hand may be accurately and efficiently recognized.

Figure 13:
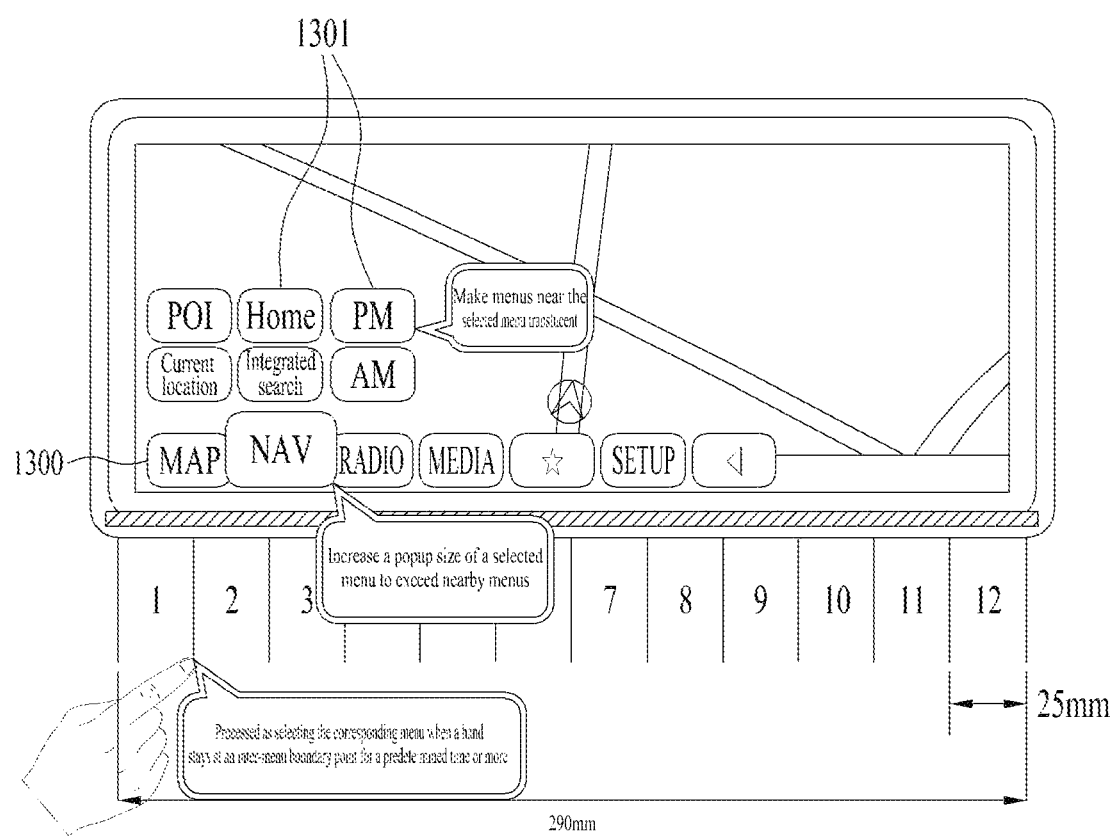
FIG. 13 illustrates a display UI/UX according to embodiments.

FIG. 13 illustrates a display UI/UX according to embodiments.

FIG. 13 illustrates a display and a pre-information function implemented by the sensing area/field of FIG. 11 and FIG. 12.

A vehicle, a vehicle control method, and a display of the vehicle according to embodiments may use an algorithm for recognizing a hand position at a boundary point between menus. With LED and/or PD savings, it is possible to overcome technical limitations that are difficult to accurately match a position of a hand and a pop-up menu. If a hand stays at a boundary between menus for more than a certain period of time, it may be set a menu popped up first as selected. The processing of the boundary may be variously changed for user convenience according to settings. A UI may be provided to a user by popping up a selected menu size large enough to exceed a surrounding menu range. By enlarging a pop-up menu, if a menu selected by a user is not a desired menu, it may be actively induced to leave the corresponding menu.

As shown in FIG. 10, due to the sensing area/field according to embodiments, 12 sections of first and second steps corresponding to the width 290 mm and the interval 25 mm may be provided. The number of fields may be variously changed according to settings. When a position of a user's hand is located in the first step, a main menu is popped up (1300), and when the position of the hand is located in the second step, sub-menus according to a corresponding section and a surrounding section may be popped up in a manner of differentiating resolutions and/or sizes (1301). As described above, it is possible to reduce facility complexity, increase position recognition accuracy, and provide a UI/UX and the like for user convenience.

Figure 14:
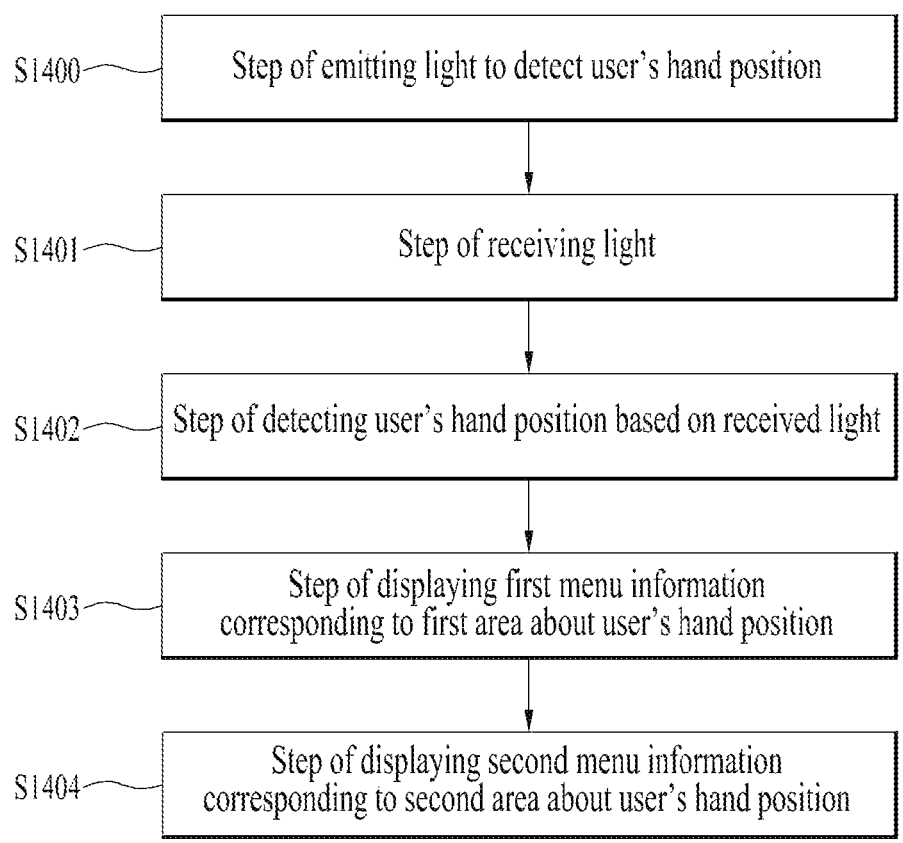
FIG. 14 illustrates a vehicle control method according to embodiments.

FIG. 14 illustrates a vehicle control method according to embodiments.

The vehicle, the vehicle control method, and the display of the vehicle according to the above-described embodiments may control the vehicle by the following method and provide a display related to the vehicle.

The vehicle control method according to the embodiments may include a step S1400 of emitting light to sense a position of a user's hand.

The vehicle control method according to the embodiments may include a step S1401 of receiving light.

The vehicle control method according to the embodiments may include a step S1402 of detecting the position of the user's hand based on the received light.

By transmitting and receiving the light like FIG. 11, FIG. 12, or the like, the position of the user's hand may be accurately detected through the reflected light.

The vehicle control method according to the embodiments may further include a step S1403 of displaying a first menu information corresponding to a first zone related to the position of the user's hand.

The vehicle control method according to the embodiments may further include a step S1404 of displaying a second menu information corresponding to a second zone related to the position of the user's hand.

As shown in FIGS. 4 to 8, 10, 13, and the like, a position of a user's hand may be recognized by separating zones having detailed sections, and information desired by a user may be accurately and efficiently provided in advance.

A display of a vehicle according to embodiments may include a display panel (i.e., a display screen) displaying information on the vehicle and a sensor unit detecting a position of a hand of a user of the vehicle. The sensor unit may include at least one light emitting unit and at least one sensor receiving light. The number of the light emitting units may be greater than the number of the sensors, and the sensor may be positioned in at least one of a left side, middle side, or a right side of the sensor unit. The light emitting units may transmit light in a state aligned in a row based on a time difference from the left side to the right side. A sensing area/field generated by the sensor unit may include a first zone detecting an approach of the user's hand and a second zone detecting a specific position of the user's hand, and the second zone may include a plurality of sections. In response to the first zone, a display unit may pop up a main menu. In response to the section of the second zone, the display unit may pop up a submenu. The submenu may be displayed together with a surrounding menu related to the main menu, and the surrounding menu and the submenu may be displayed with different resolutions, respectively.

Embodiments are described from the perspective of a method and/or an apparatus, and descriptions of the method and the apparatus may be complementarily applicable.

For convenience of description, the respective drawings are divided and described, but it is also possible to design to implement a new embodiment by merging the embodiments described in the respective drawing. It is also within the scope of the rights of the embodiments to design a computer-readable recording medium in which a program for executing the embodiments described above is recorded according to the needs of those skilled in the art. An apparatus and method according to the embodiments may not be limited to the configuration and method of the embodiments described above, but the embodiments may be selectively configured in combination with all or some of the embodiments so as to perform various modifications. Although preferred embodiments are illustrated and described, the embodiments are not limited to the specific embodiments described above, and various modifications may be implemented by those skilled in the art without departing from the gist of the embodiments claimed in the claims, and these modifications should not be individually understood from the technical ideas or prospects of the embodiments.

Various components of apparatuses of embodiments may be implemented by hardware, software, firmware, or a combination thereof. Various components of embodiments may be implemented with one chip, for example, one hardware circuit. Depending on embodiments, components according to embodiments may be implemented with separate chips, respectively. Depending on embodiments, at least one of components of an apparatus according to embodiments may be configured with one or more processors capable of executing one or more programs, and the one or more programs may execute one or more of operations/methods according to embodiments or instructions for executing the same. Executable instructions for performing methods/operations of an apparatus according to embodiments may be stored in non-transitory CRM or other computer program products configured to be executed by one or more processors, or in temporary CRM or other computer program products configured to be executed by one or more processors. In addition, a memory according to embodiments may be used as a concept including not only volatile memory (e.g., RAM), but also nonvolatile memory, flash memory, PROM, etc. Also, implementation in the form of a carrier wave such as transmission over the Internet may be included. In addition, a processor-readable recording medium may be distributed to networked computer systems, and processor-readable codes can be stored and executed in a distributed manner.

In this document, "/" and "," are interpreted as "and/or". For example, "A/B" is interpreted as "A and/or B", and "A, B" is interpreted as "A and/or B". Additionally, "A/B/C" means "at least one of A, B, and/or C". In addition, "A, B, C" also means "at least one of A, B, and/or C". Additionally, "or" in this document is interpreted as "and/or". For example, "A or B" may mean 1) only "A", 2) only "B", or 3) "A and B". In other words, "or" in this document may mean "additionally or alternatively".

Terms such as first, second, and the like may be used to describe various components of embodiments. However, various components according to embodiments should not be limited in interpretation by the above terms. These terms are merely used to distinguish one component from another. For example, a first user input signal may be referred to as a second user input signal. Similarly, the second user input signal may be referred to as the first user input signal. The use of these terms should be interpreted as not departing from the scope of various embodiments. Both the first user input signal and the second user input signal are user input signals, but do not mean the same user input signals unless clearly indicated in the context.

Terms used to describe embodiments are used for describing specific embodiments and are not intended to limit them. As used in the description and claims of embodiments, the singular is intended to include plural unless clearly stated in the context. The 'and/or' expression is used in a sense to include all possible combinations between terms. The 'including' expression describes the presence of features, numbers, steps, elements, and/or components, and does not mean that additional features, numbers, steps, elements, and/or components are not included. Condition expressions such as "in the case of~", and "when~", used to describe embodiments are not limited to optional cases only. When a specific condition is satisfied, a related operation is performed in response to the specific condition, or a related definition is intended to be interpreted.

In addition, operations according to the embodiments described in the present document may be performed by a transceiver including a memory and/or a processor according to the embodiments. The memory may store programs for processing/controlling operations according to embodiments, and the processor may control various operations described in the present document. The processor may be referred to as a controller or the like. The operations of the embodiments may be performed by firmware, software, and/or a combination thereof, and the firmware, software, and/or a combination thereof may be stored in a processor or memory.

Meanwhile, the operations according to the above-described embodiments may be performed by a transmission device and/or a reception device according to embodiments. A transceiver may include a transceiver that transmits and receives media data, a memory that stores instructions (e.g., program code, algorithm, flowchart, and/or data) for a process according to embodiments, and a processor that controls operations of the transceiver.

A processor may be referred to as a controller or the like, and may correspond to, for example, hardware, software, and/or a combination thereof. The operations according to the above-described embodiments may be performed by the processor. In addition, the processor may be implemented as an encoder/decoder or the like for the operations of the above-described embodiments.

What is claimed is:

1. A vehicle comprising:
a display unit configured to display information on a screen;
a sensor unit disposed below the screen, extending along a bottom edge of the screen, and configured to detect a position of a user's hand at a sensing area in front of the screen, the sensing area including (1) a first zone for detecting an approach of the user's hand and (2) a second zone for detecting a position of the user's hand, the sensor unit including (1) a plurality of light emitting units configured to emit light to the sensing area and (2) one or more sensors configured to sense the light emitted to the sensing area and reflected by the user's hand at the sensing area; and
a controller configured to control the display unit to perform:
in response to the sensor unit detecting the approach of the user's hand at the first zone, displaying, at a bottom portion of the screen, a plurality of selectable main menu items arranged in a row extending along the sensor unit, and
in response to the sensor unit detecting the user's hand at the second zone, displaying, at a portion of the screen above the plurality of selectable main menu items, a plurality of selectable submenu items of one of the plurality of selectable main menu items displayed at a portion on the row corresponding to the position of the user's hand detected at the second zone,
wherein the plurality of light emitting units are arranged in a row and configured to sequentially emit the light from a first end to a second end of the row of the plurality of light emitting units, and wherein the sensor unit is configured to detect the position of and a distance related to the user's hand based on an infrared intensity of the light reflected by the user's hand.

2. The vehicle of claim 1, wherein:
a number of the plurality of light emitting units is greater than that of the one or more sensors, and
each of the one or more sensors is positioned in at least one of left, middle and right portions of the sensor unit.

3. The vehicle of claim 1, wherein a number of the one or more sensors is less than that of the plurality of light emitting units.

4. The vehicle of claim 1, wherein the controller is configured to control the display unit to display, on the screen, the plurality of selectable submenu items together with a plurality of surrounding menu items related to the one of the plurality of selectable main menu items displayed at the portion of the row corresponding to the position of the user's hand detected at the second zone, the plurality of surrounding menu items displayed on the screen having a resolution different from that of the plurality of selectable submenu items displayed on the screen.

5. A method of controlling a vehicle comprising (1) a display unit configured to display information on a screen and (2) a sensor unit disposed below the screen, extending along a bottom edge of the screen, and configured to detect a position of a user's hand at a sensing area in front of the screen, the sensor unit including (1) a plurality of light emitting units configured to emit light to the sensing area and (2) one or more sensors configured to receive the light emitted to the sensing area and reflected by the user's hand, the method comprising:
controlling the plurality of light emitting units of the sensor unit to emit the light to the sensing area, the sensing area including (1) a first zone for detecting an approach of the user's hand and (2) a second zone for detecting a position of the user's hand;
controlling the one or more sensors of the sensor unit to receive the light emitted to the sensing area and reflected by the user's hand;
detecting, based on the light received by the one or more sensors of the sensor unit, a position of a user's hand at the sensing area in front of the display unit;
in response to detecting that the user's hand is positioned at the first zone of the sensing area, controlling the display unit to display, at a bottom portion of the screen, a plurality of selectable main menu items arranged in a row extending along the sensor unit; and
in response to detecting the user's hand at the second zone of the sensing area, controlling the display unit to display, at a portion of the screen above the plurality of selectable main menu items, a plurality of selectable submenu items of one of the plurality of selectable main menu items displayed at a portion on the row corresponding to the position of the user's hand detected at the second zone,
wherein the plurality of light emitting units are arranged in a row and configured to sequentially emit the light from a first end to a second end of the row of the plurality of light emitting units, and
wherein the sensor unit is configured to detect the position of and a distance related to the user's hand based on an infrared intensity of the light reflected by the user's hand.

6. The method of claim 5, wherein:
a number of the plurality of light emitting units is greater than that of the one or more sensors, and
each of the one or more sensors is positioned in at least one of left, middle and right portions of the sensor unit.

7. The method of claim 5, wherein a number of the one or more sensors is less than a number of the plurality of light emitting units.

8. The method of claim 5, wherein controlling the display unit to display the plurality of selectable submenu items comprises controlling the display unit to display, on the screen, the plurality of selectable submenu items together with a plurality of surrounding menu items related to the one of the plurality of selectable main menu items displayed at the portion of the row corresponding to the position of the user's hand detected at the second zone, the plurality of surrounding menu items displayed on the screen having a resolution different from that of the plurality of selectable submenu items displayed on the screen.

9. A display of a vehicle, comprising:
a display unit configured to display information on a screen; and
a sensor unit disposed below the screen, extending along a bottom edge of the screen, and configured to detect a movement and position of a user's hand at a sensing area in front of the screen, the sensing area including (1) a first zone for detecting an approach of the user's hand and (2) a second zone for detecting a position of the user's hand, the sensor unit including a plurality of light emitting units configured to emit light to the sensing area and one or more sensors configured to sense the light emitted to the sensing area and reflected by the user's hand at the sensing area,
wherein the display unit is configured to:
in response to the sensor unit detecting the approach of the user's hand at the first zone, display, at a bottom portion of the screen, a plurality of selectable main menu items arranged in a row extending along the sensor unit; and
in response to the sensor unit detecting the user's hand at the second zone, display, at a portion of the screen above the plurality of selectable main menu items, a plurality of selectable submenu items of one of the plurality of selectable main menu items displayed at a portion on the row corresponding to the position of the user's hand detected at the second zone,
wherein the plurality of light emitting units are arranged in a row and configured to sequentially emit the light from a first end to a second end of the row of the plurality of light emitting units, and
wherein the sensor unit is configured to detect the position of and a distance related to the user's hand based on an infrared intensity of the light reflected by the user's hand.

10. The display of claim 9, wherein:
a number of the plurality of light emitting units is greater than that of the one or more sensors, and
each of the one or more sensors is positioned in at least one of left, middle and right sides of the sensor unit.

11. The display of claim 9, wherein a number of the one or more sensors is less than that of the plurality of light emitting units.

12. The display of claim 9, wherein the display unit is further configured to, in response to the sensor unit detecting the user's hand at the second zone, display, on the screen, the plurality of selectable submenu items together with a plurality of surrounding menu items related to the one of the plurality of selectable main menu items displayed at the portion of the row corresponding to the position of the user's hand detected at the second zone, the plurality of surrounding menu items displayed on the screen having a resolution different from that of the plurality of selectable submenu items displayed on the screen.

* * * * *